(12) United States Patent
Ballard

(10) Patent No.: US 8,111,145 B2
(45) Date of Patent: Feb. 7, 2012

(54) STARTER CONTROL AND INDICATOR SYSTEM

(75) Inventor: Claudio R. Ballard, Fort Lauderdale, FL (US)

(73) Assignee: Veedims, LLC, Fort Lauderdale, FL (US)

( * ) Notice: Subject to any disclaimer, the term of this patent is extended or adjusted under 35 U.S.C. 154(b) by 258 days.

(21) Appl. No.: 12/398,929

(22) Filed: Mar. 5, 2009

(65) Prior Publication Data
US 2009/0224895 A1 Sep. 10, 2009

Related U.S. Application Data

(60) Provisional application No. 61/034,934, filed on Mar. 7, 2008.

(51) Int. Cl.
*B60R 25/10* (2006.01)
(52) U.S. Cl. .................................. 340/426.11
(58) Field of Classification Search ............. 340/426.11, 340/825.22, 5.7, 426.3, 425.5, 5.6; 701/36; 307/10.2
See application file for complete search history.

(56) References Cited

U.S. PATENT DOCUMENTS

| | | |
|---|---|---|
| 1,848,064 A | 3/1932 | Oishei |
| 2,180,731 A | 11/1939 | Dickinson |
| 2,496,700 A | 2/1950 | Cole |
| 2,786,359 A | 3/1957 | Karlan et al. |
| 2,801,118 A | 7/1957 | Amesbury |
| 2,881,860 A | 4/1959 | Ternes |
| 2,897,916 A | 8/1959 | Probst |

(Continued)

FOREIGN PATENT DOCUMENTS

DE 10311396 A1 9/2004

OTHER PUBLICATIONS

Vanderwerp, Dave, "2011 Dodge Circuit EV—First Drive Review." Jun. 2009; pp. 1-4; available at http://www.caranddriver.com/reviews/car/09q2/2011_1 dodge_circuit_ev-first_drive_review.

*Primary Examiner* — Phung Nguyen
(74) *Attorney, Agent, or Firm* — Howison & Arnott, L.L.P.

(57) ABSTRACT

A single-button ignition control and starting system for a vehicle. The system comprises an onboard computer, a start button, a light source, a clutch sensor, engine sensor and an identity sensor. The computer is connected to the ignition system and starter motor. The start button is connected to the computer to indicate whether the start button is depressed. The light source is connected to the computer to selectively illuminate the start button in a first, a second and a third illumination color. The clutch sensor is connected to the computer to indicate whether the clutch pedal is depressed. The engine sensor is connected to the computer to indicate whether the engine is running. The identity sensor adapted to receive identity indicia and is connected to the computer for producing signals indicative of the identity indicia. When the onboard computer 1) receives signals from the identity sensor indicative of a predetermined identity indicia being received, 2) of the engine not running, and 3) of the clutch pedal not being depressed, then the onboard computer 1) energizes the light source to illuminates the start button in the first illumination color and 2) does not energize the starter motor if the start button is depressed.

12 Claims, 7 Drawing Sheets

U.S. PATENT DOCUMENTS

| | | | |
|---|---|---|---|
| 3,133,741 | A | 5/1964 | Garabello |
| 3,259,684 | A | 7/1966 | Wakefield |
| 3,279,834 | A | 10/1966 | Budzynski |
| 3,351,364 | A | 11/1967 | Warn et al. |
| 3,433,891 | A | 3/1969 | MacKenzie, Jr. et al. |
| 3,435,701 | A | 4/1969 | Bucher |
| 3,641,746 | A | 2/1972 | Smith et al. |
| 3,691,525 | A | 9/1972 | McClellan et al. |
| 3,831,209 | A | 8/1974 | Clingman |
| 4,061,054 | A | 12/1977 | Wenninger |
| 4,135,593 | A | 1/1979 | Fowkes |
| 4,236,274 | A | 12/1980 | Omote et al. |
| 4,441,382 | A | 4/1984 | Snooks |
| 4,515,393 | A | 5/1985 | Sauter |
| 4,590,339 | A | 5/1986 | Scott-Jackson et al. |
| 4,591,211 | A | 5/1986 | Browning et al. |
| 4,707,788 | A | 11/1987 | Tashiro et al. |
| 4,771,368 | A | 9/1988 | Tsukamoto et al. |
| 4,772,299 | A | 9/1988 | Bogusz |
| 4,807,490 | A | 2/1989 | Foggini |
| 4,825,669 | A | 5/1989 | Herrera |
| 5,048,471 | A | 9/1991 | Takli et al. |
| 5,064,274 | A | 11/1991 | Alten |
| 5,066,062 | A | 11/1991 | Sekulovski |
| 5,121,818 | A | 6/1992 | McComic |
| 5,133,750 | A | 7/1992 | Momose et al. |
| 5,149,915 | A | 9/1992 | Brunker et al. |
| 5,156,198 | A | 10/1992 | Hall |
| 5,304,739 | A | 4/1994 | Klug et al. |
| 5,322,340 | A | 6/1994 | Sato et al. |
| 5,431,485 | A | 7/1995 | Hayashi |
| 5,517,173 | A | 5/1996 | Cha et al. |
| 5,557,698 | A | 9/1996 | Gareis et al. |
| 5,613,012 | A | 3/1997 | Hoffman et al. |
| 5,615,277 | A | 3/1997 | Hoffman |
| 5,635,903 | A | 6/1997 | Koike et al. |
| 5,637,933 | A | 6/1997 | Rawlings et al. |
| 5,738,369 | A | 4/1998 | Durrani |
| 5,745,027 | A | 4/1998 | Malville |
| 5,770,797 | A | 6/1998 | Lapohn |
| 5,794,733 | A | 8/1998 | Stosel et al. |
| 5,802,922 | A | 9/1998 | Kawai et al. |
| 5,808,374 | A | 9/1998 | Miller et al. |
| 5,853,857 | A | 12/1998 | Mahmood et al. |
| 5,870,723 | A | 2/1999 | Pare, Jr. et al. |
| 5,910,988 | A | 6/1999 | Ballard |
| 5,934,744 | A | 8/1999 | Jergens et al. |
| D416,525 | S | 11/1999 | Sacco et al. |
| 5,988,238 | A | 11/1999 | Palvolgyi |
| 6,032,137 | A | 2/2000 | Ballard |
| 6,092,898 | A | 7/2000 | De Juan, Jr. |
| 6,116,700 | A | 9/2000 | Herrera |
| 6,182,807 | B1 | 2/2001 | Saito et al. |
| 6,198,244 | B1 | 3/2001 | Hayden et al. |
| D440,918 | S | 4/2001 | Pfeiffer |
| 6,234,555 | B1 | 5/2001 | Emmerich et al. |
| 6,253,131 | B1 | 6/2001 | Quigley et al. |
| 6,253,716 | B1 | 7/2001 | Palmer et al. |
| 6,263,447 | B1 | 7/2001 | French et al. |
| 6,269,348 | B1 | 7/2001 | Pare, Jr. et al. |
| 6,282,658 | B2 | 8/2001 | French et al. |
| 6,321,339 | B1 | 11/2001 | French et al. |
| 6,357,563 | B1 | 3/2002 | Hayford et al. |
| 6,366,682 | B1 | 4/2002 | Hoffman et al. |
| 6,397,198 | B1 | 5/2002 | Hoffman et al. |
| 6,411,728 | B1 | 6/2002 | Lee et al. |
| 6,479,973 | B2 | 11/2002 | Saito et al. |
| D471,139 | S | 3/2003 | Wyszogrod et al. |
| D481,337 | S | 10/2003 | Hartono et al. |
| 6,693,523 | B1 | 2/2004 | Abel et al. |
| 6,718,842 | B1 | 4/2004 | Bofias |
| D492,629 | S | 7/2004 | Hartono et al. |
| 6,780,047 | B1 | 8/2004 | Laity |
| 6,843,115 | B2 | 1/2005 | Rutherford |
| 7,004,787 | B2 | 2/2006 | Milan |
| 7,055,883 | B2 | 6/2006 | Tokutomi et al. |
| 7,068,158 | B2 | 6/2006 | Komatsu et al. |
| 7,146,129 | B2 | 12/2006 | Bostrom et al. |
| 7,165,871 | B2 | 1/2007 | Takeda et al. |
| D537,393 | S | 2/2007 | Chanteloup |
| 7,206,672 | B2 | 4/2007 | Mueller |
| 7,257,397 | B2 | 8/2007 | Shamoon et al. |
| D551,604 | S | 9/2007 | Kapffenstein |
| 7,266,435 | B2 | 9/2007 | Wang et al. |
| D551,971 | S | 10/2007 | Hardwick |
| D559,159 | S | 1/2008 | Kazyaka |
| D562,738 | S | 2/2008 | Young |
| 7,375,285 | B2 | 5/2008 | Chiang |
| D571,268 | S | 6/2008 | Hoffman |
| D574,661 | S | 8/2008 | Logan |
| D575,581 | S | 8/2008 | Harris |
| D581,843 | S | 12/2008 | Kluck |
| 7,483,952 | B2 | 1/2009 | Light et al. |
| 2002/0073507 | A1 | 6/2002 | Presley |
| 2002/0082750 | A1 | 6/2002 | Lamke et al. |
| 2003/0011546 | A1 | 1/2003 | Obata et al. |
| 2003/0204290 | A1* | 10/2003 | Sadler et al. ............ 701/1 |
| 2003/0225693 | A1 | 12/2003 | Ballard et al. |
| 2004/0043753 | A1 | 3/2004 | Wake et al. |
| 2004/0129197 | A1 | 7/2004 | Nakagawa et al. |
| 2004/0155789 | A1 | 8/2004 | Crews |
| 2004/0158723 | A1 | 8/2004 | Root |
| 2005/0021190 | A1 | 1/2005 | Worrell et al. |
| 2005/0140129 | A1 | 6/2005 | Miki et al. |
| 2005/0141225 | A1 | 6/2005 | Striebel |
| 2005/0168071 | A1 | 8/2005 | Durbin et al. |
| 2005/0257613 | A1 | 11/2005 | Spencer et al. |
| 2005/0264268 | A1 | 12/2005 | Ueno |
| 2006/0053281 | A1 | 3/2006 | Andersson |
| 2006/0097577 | A1 | 5/2006 | Kato et al. |
| 2006/0097852 | A1 | 5/2006 | Lammers et al. |
| 2006/0162485 | A1 | 7/2006 | Leng et al. |
| 2006/0266273 | A1 | 11/2006 | Westberg et al. |
| 2007/0001830 | A1 | 1/2007 | Dagci et al. |
| 2007/0024117 | A1 | 2/2007 | Boenker, IV et al. |
| 2007/0030137 | A1 | 2/2007 | Masters et al. |
| 2007/0077058 | A1 | 4/2007 | Kontani |
| 2007/0137367 | A1 | 6/2007 | Papa et al. |
| 2007/0241862 | A1* | 10/2007 | Dimig et al. ............ 340/5.62 |
| 2007/0252681 | A1* | 11/2007 | Costello et al. ............ 340/426.3 |
| 2008/0002420 | A1 | 1/2008 | Lambert et al. |
| 2008/0007961 | A1 | 1/2008 | Mochizuki et al. |
| 2008/0031004 | A1 | 2/2008 | Chu |
| 2008/0034209 | A1 | 2/2008 | Dickinson et al. |
| 2008/0157593 | A1 | 7/2008 | Bax et al. |
| 2008/0222844 | A1 | 9/2008 | Broadhead et al. |
| 2008/0290988 | A1* | 11/2008 | Ramirez et al. ............ 340/426.11 |
| 2009/0011639 | A1 | 1/2009 | Ballard et al. |
| 2009/0016216 | A1 | 1/2009 | Ballard et al. |
| 2009/0223318 | A1 | 9/2009 | Ballard |
| 2009/0223437 | A1 | 9/2009 | Ballard |
| 2009/0223438 | A1 | 9/2009 | Ballard |
| 2009/0223757 | A1 | 9/2009 | Ballard |
| 2009/0223789 | A1 | 9/2009 | Ballard |
| 2009/0224895 | A1 | 9/2009 | Ballard |
| 2009/0267405 | A1 | 10/2009 | Ballard |
| 2009/0271949 | A1 | 11/2009 | Sprague et al. |
| 2009/0272313 | A1 | 11/2009 | Ballard et al. |
| 2009/0272589 | A1 | 11/2009 | Ballard |
| 2009/0273170 | A1 | 11/2009 | Ballard et al. |
| 2009/0273208 | A1 | 11/2009 | Ballard et al. |
| 2009/0273282 | A1 | 11/2009 | Ballard et al. |
| 2009/0273942 | A1 | 11/2009 | Ballard et al. |
| 2009/0274416 | A1 | 11/2009 | Ballard |
| 2009/0277707 | A1 | 11/2009 | Ballard |
| 2009/0289062 | A1 | 11/2009 | Ballard |
| 2009/0289757 | A1 | 11/2009 | Ballard |
| 2010/0231351 | A1* | 9/2010 | Lickfelt et al. ............ 340/5.6 |

* cited by examiner

STARTER CONTROL AND INDICATOR SYSTEM

CROSS-REFERENCE TO RELATED APPLICATIONS

This application claims the benefit of U.S. Provisional Application for Patent Ser. No. 61/034,934, filed Mar. 7, 2008, and entitled STARTER INDICATOR SYSTEM, the specification of which is incorporated herein in its entirety by reference.

TECHNICAL FIELD

The following disclosure relates to vehicle control systems, and more particularly, to systems for the control of engine starter and ignition systems such as those found in automobiles and other vehicles having internal combustion engines.

BACKGROUND

Push-button starter switches for vehicles are well known. Such push-button switches are often used to energize an electric starter motor that initially "turns over" (i.e., spins) an internal combustion engine until self-sustaining combustion is established. The user must typically manipulate separate switches to control the state of related systems, e.g., the ignition system ON and OFF states. Further, the user is usually required to coordinate the activation sequence of the various switches in order to start and operate the vehicle's engine.

Electro-mechanical rotary ignition switches are also well known. Such switches combine an ignition switch and a starter switch (often with a key lock) into a single rotating assembly. To some extent, the rotary ignition switch assists the user in properly sequencing the ignition and the starter motor when the switch is turned. However, such switches typically do not prevent undesirable actions by the user, e.g., re-energizing the starter motor when the engine is already running, or turning the ignition to the OFF state when the care is moving.

A need exists for an integrated starter control and indicator system that automatically coordinates operation of the starter and the ignition system using a single switch, while also preventing undesirable actions that may damage the vehicle or pose a danger of accident. Preferably, the system will indicate pending actions directly on the starter switch.

SUMMARY

The present disclosure, in one aspect thereof, provides a single-button ignition control and starting system for a vehicle having an engine, an ignition system, a starter motor and a manually-operated clutch pedal. The system comprises an onboard computer, a start button, a light source, a clutch sensor, engine sensor and an identity sensor. The onboard computer is operatively connected to the ignition system for selectively energizing the ignition system and is operatively connected to the starter motor for selectively energizing the starter motor. The start button is operatively connected to the onboard computer and is adapted to produce signals indicative of whether the button is depressed. The light source is operatively connected to the onboard computer and adapted to selectively illuminate the start button in a first, a second and a third illumination color. The clutch sensor is operatively connected to the onboard computer and adapted to produce signals indicative of whether the clutch pedal is depressed. The engine sensor is operatively connected to the onboard computer and adapted to produce signals indicative of whether the engine is running. The identity sensor adapted to receive identity indicia and is operatively connected to the onboard computer for producing signals indicative of the identity indicia received. When the onboard computer 1) receives signals from the identity sensor indicative of a predetermined identity indicia being received, 2) receives signals from the engine sensor indicative of the engine not running, and 3) receives signals from the clutch sensor indicative of the clutch pedal not being depressed, then the onboard computer 1) energizes the light source to illuminates the start button in the first illumination color and 2) does not energize the starter motor if the start button is depressed.

The present disclosure, in another aspect thereof, provides a single-button ignition control and starting system wherein when the onboard computer 1) receives signals from the identity sensor indicative of the predetermined identity indicia being received, 2) receives signals from the engine sensor indicative of the engine not running, and 3) receives signals from the clutch sensor indicative of the clutch pedal being depressed, then the onboard computer, when the start button is not depressed, energizes the light source to illuminates the start button in the second illumination color and does not energize the starter motor, and when the start button is depressed, energizes the ignition system and energizes the starter motor.

The present disclosure, in a further aspect thereof, provides a single-button ignition control and starting system wherein when the onboard computer receives signals from the engine sensor indicative of the engine running, then the onboard computer energizes the light source to illuminates the start button in the third illumination color, and when the start button is depressed, de-energizes the ignition system.

In another aspect thereof, a process for starting a vehicle engine is disclosed. The starter system detects the operator approaching the vehicle by means of a transmitter carried by the operator, for example, a fob RFID carried by the operator. An onboard microprocessor illuminates a starter push button with a discrete light source having a first color. A sensor detects the clutch of the vehicle being disengaged and transmits a signal to a microprocessor that illuminates the push button with a discrete light source having a second color. When the operator depresses the push button, a signal is transmitted to a microprocessor which de-energizes the second discrete light source and energizes a third discrete light source having a third color. The next time the button is depressed, the microprocessor de-energizes the vehicle ignition system.

BRIEF DESCRIPTION OF THE DRAWINGS

For a more complete understanding, reference is now made to the following description taken in conjunction with the accompanying Drawings in which.

DETAILED DESCRIPTION

Figure 1:
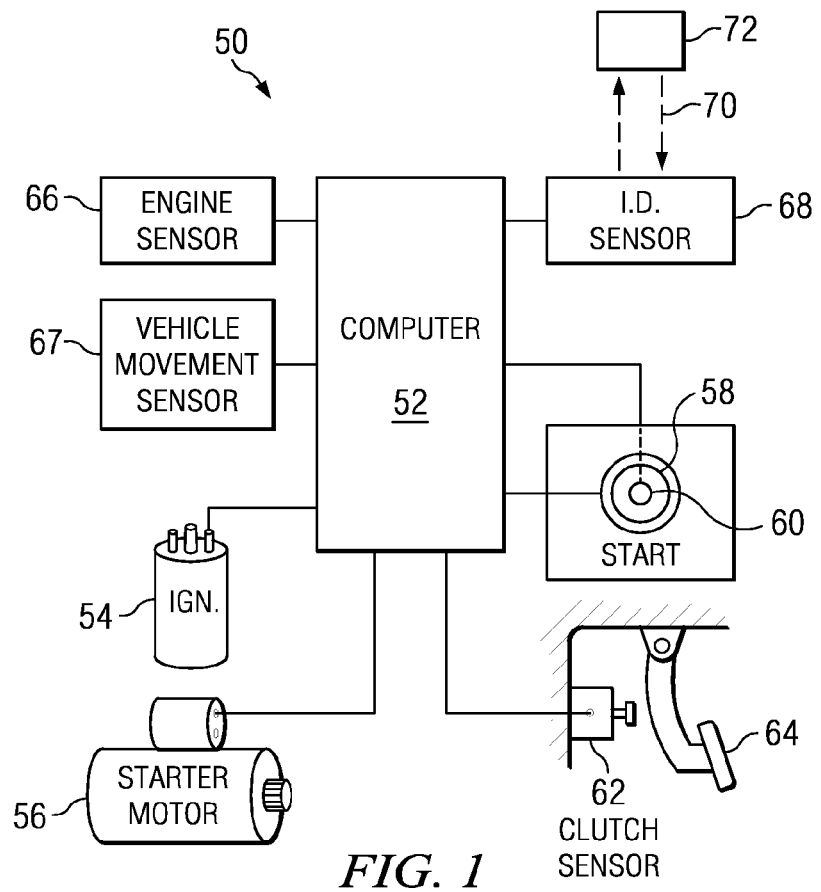
FIG. 1 is a schematic view of a starter control and indicator system in accordance with one aspect.

Referring now to the drawings, wherein like reference numbers are used herein to designate like elements throughout, the various views and embodiments of a starter indicator system. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a single-button ignition control and starting system for a vehicle in accordance with one aspect. In this embodiment, the system is adapted for a vehicle having a manually-operated clutch. The system 50 includes an onboard computer 52 mounted in the vehicle, which computer may in some cases be the main Engine Control Unit (ECU) or Vehicle Control Unit (VCU). In other cases, the onboard computer 52 may be a special purpose computer, microprocessor or microcontroller. The onboard computer 52 is operatively connected to the vehicle's ignition system 54 for selectively energizing the ignition system and operatively connected to the vehicle's starter motor 56 for selectively energizing the starter motor. A start button 58 is operatively connected to the onboard computer 52 and adapted to produce signals indicative of whether the button is depressed. A light source 60 is operatively connected to the onboard computer 52 and adapted to selectively illuminate the start button 58 in a plurality of illumination colors. In one embodiment, the light source 60 may produce a first, a second and a third illumination color. In other embodiments, the light source may further produce a fourth illumination color. In a preferred embodiment, the second and third illumination colors are green and red, respectively.

Referring still to FIG. 1, a clutch sensor 62 is operatively connected to the onboard computer 52 and adapted to produce signals indicative of whether the clutch pedal 64 is depressed (i.e., clutch disengaged). Alternatively, the clutch sensor 62 may be connected directly to the clutch (not shown) to produce signals indicative of whether the clutch is disengaged. An engine sensor 66 is operatively connected to the onboard computer 52 and adapted to produce signals indicative of whether the vehicle's engine is running. The engine sensor 66 may be an existing sensor that measures engine RPMs (e.g., a tachometer) or other parameters, or it may be a special-purpose sensor, as long as an indication of self-sustaining operation of the engine is provided. A movement sensor 67 may be operatively connected to the onboard computer 52 and adapted to produce signals indicative of whether the vehicle is moving. The movement sensor 67 may be an existing sensor that measures vehicle speed (e.g., a speedometer) or other parameters, or it may be a special-purpose sensor, as long as an indication of vehicle motion is provided. In some embodiments, vehicle motion as reported by the movement sensor 67 may be indicative of vehicle movement at speeds above a predetermined minimum speed, rather than indicative of movement or absolute lack thereof.

An identity sensor 68 is operatively connected to the onboard computer 52 and is adapted to sense (denoted by arrows 70) nearby identity modules 72 so as to receive identity indicia. The identity sensor 68 produces signals indicative of the identity indicia received and provides them to the onboard computer 52. In some embodiments, the identity sensor 68 may be a Radio Frequency Identification (RFID) transceiver and the identity module 72 may be a RFID tag carrying identification indicia embedded in a vehicle key or keyless entry fob. In other embodiments, the identity sensor 68 may be a card reader and the identity module 72 may be a magnetic-stripe card or IC-enabled "smart card" carrying identification indicia.

Basic operation of the system 50 in one aspect is as follow: When the onboard computer 52 receives signals 70 from the identity sensor 68 indicative of a predetermined identity indicia being received from an identity module 72, and receives signals from the engine sensor 66 indicative of the engine not running, and further receives signals from the clutch sensor 62 indicative of the clutch pedal not being depressed (i.e., clutch is engaged), then the onboard computer energizes the light source 60 to illuminate the start button 58 in the first illumination color. This state might occur when a vehicle operator carrying valid identity indicia (e.g., keyless entry fob or smart card) enters the vehicle, but does not yet depress the clutch pedal. The system 50 would detect the operator as an authorized user, and illuminate the starter button 60 in a first color (e.g., blue), to indicate that he/she has been recognized. However, the first color also indicates that the vehicle is not yet ready to start, since the clutch pedal 64 has not been depressed. Accordingly, the starter motor 56 is not energized if the start button 58 is pressed in this state.

Operation of the system 50 in another aspect occurs when, following the actions described in the preceding paragraph, the operator depresses the clutch pedal and activates the clutch sensor 62. When the onboard computer 52 receives signals from the identity sensor 68 indicative of the predetermined identity indicia being received, receives signals from the engine sensor 66 indicative of the engine not running, and receives signals from the clutch sensor 62 indicative of the clutch pedal 64 being depressed, then the onboard computer changes the system to allow engine starting. Under these conditions, when the start button 60 is not depressed, the light source 60 is selectively illuminated to illuminate the start button 58 in the second illumination color (e.g., green) and the starter motor 56 is not energized. It will be appreciated that the start button 58 being illuminated in the second color (e.g., green) indicates the next operation to be performed if the start button is pushed, i.e., starting ("green=go"). Under these conditions, when the start button 58 is depressed, the ignition system 54 is energized and the starter motor 56 is energized to turn over the engine for starting. This state might occur when a vehicle operator carrying valid identity indicia enters the vehicle and depresses the clutch pedal. The system 50 would detect the operator as an authorized user and that the clutch pedal is depressed, such that the vehicle is now ready to start. Accordingly, the starter button 58 is illuminated in a second color (e.g., green), to indicate that pressing the start button will activate the ignition 54 and starter motor 56 to start the vehicle. Once the start button 58 is pressed, the light may change to the third illumination color.

Operation of the system 50 in another aspect occurs when, following the actions described in the preceding paragraph, the onboard computer 52 receives signals from the engine sensor 66 indicative of the engine running. In this state, the computer 52 energizes the light source 60 to illuminate the start button 58 in the third illumination color (e.g., red), and when the start button is depressed, the computer de-energizes the ignition system 54 to stop the engine. This state might occur when the vehicle's engine is running. Accordingly, the starter button 58 is illuminated in a third color (e.g., red), to indicate that pressing the start button will "kill" the ignition 54 to shut down the vehicle's engine.

Operation of the system 50 in another aspect occurs when the vehicle movement sensor 67 is utilized. When the onboard computer 52 receives signals from the engine sensor 66 indicative of the engine running and receives signals from the vehicle movement sensor 67 indicative of the vehicle moving, then the computer energizes the light source 60 to illuminate the start button 58 in the fourth illumination color (e.g., amber or orange) and does not de-energize the ignition system 54 if the start button is depressed. This state might occur when the vehicle engine is running and the vehicle is moving (or moving faster than a predetermined speed). Under these circumstances, shutting down the engine might present a hazard. Thus, the starter button 58 is illuminated in a fourth color (e.g., amber/orange), to indicate that pressing the start button will not "kill" the ignition 54 to shut down the vehicle's engine. As soon as the vehicle movement sensor 67 indicates the vehicle has stopped moving (or slowed below a predetermined speed), then the system 50 returns to the previous state, i.e., the computer 52 again energizes the light source 60 to illuminate the start button 58 in the third color (e.g., red), to indicate that pressing the start button will "kill" the ignition 54 to shut down the vehicle's engine.

Figure 2A:
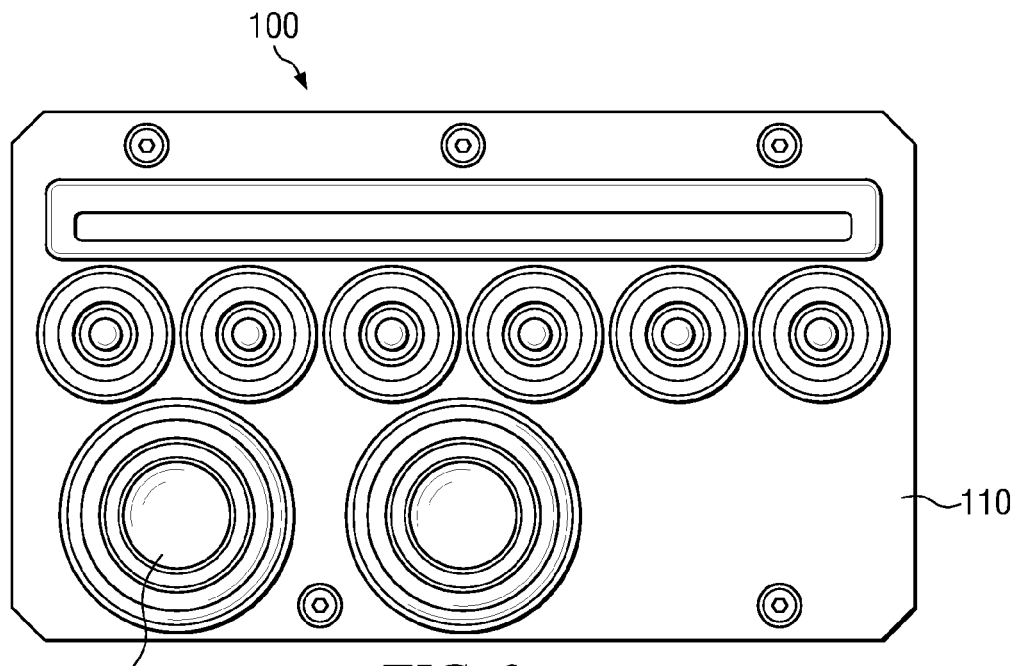
FIG. 2*a* is a front view of a switch assembly for use in a vehicle such as an automobile.

FIG. 2a is a front view of a switch assembly 100 for automobile applications. Assembly 100 includes a cover plate or panel 110 that may be formed from a material such as polished aluminum, plastic or another suitable material to give a pleasing appearance. A push button 102 is mounted in panel 110. Push button 102 is formed from a transparent or translucent material and controls the ignition system of the vehicle in which assembly 100 is mounted.

Figure 2B:
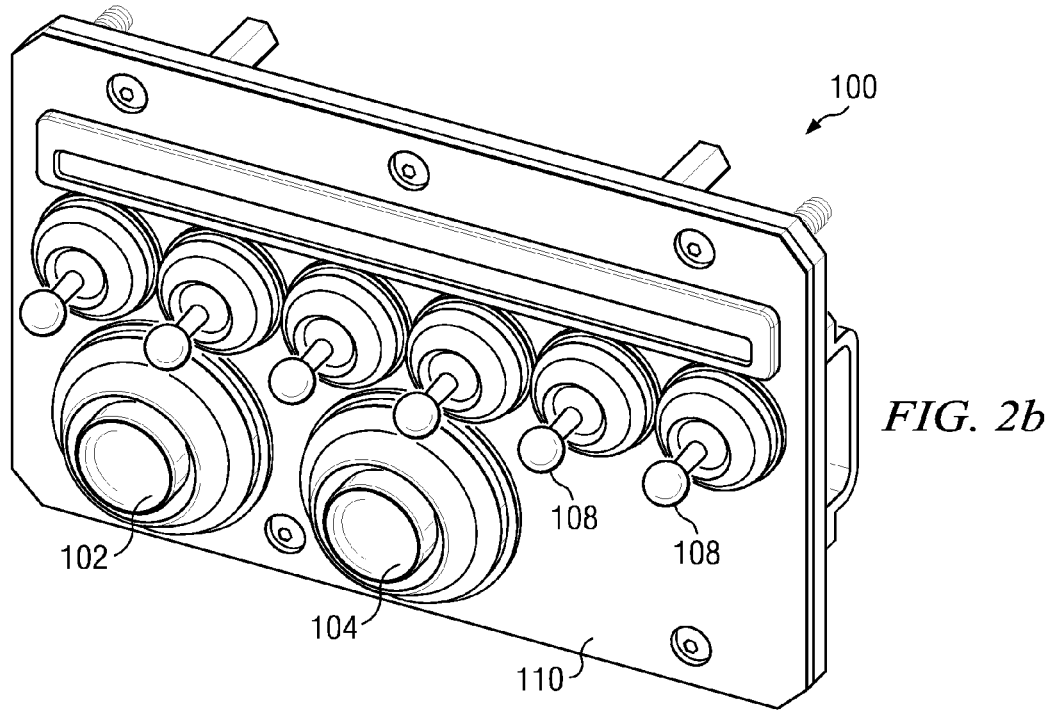
FIG. 2*b* is a second perspective view of the switch assembly of FIG. 2*a*.

FIG. 2b is a second perspective view of assembly 100. In the illustrated embodiment, a second push button 104 is mounted. Push button 104 controls the operation of a vehicle's hazard lights. Assembly 100 also includes a plurality of toggle switches 108 which control various vehicle functions such as windshield wipers, door locks, etc. In one embodiment, push buttons 102 and 104 may be formed from a transparent or translucent material such as plastic, glass or a synthetic gemstone such as synthetic sapphire.

Figure 4:
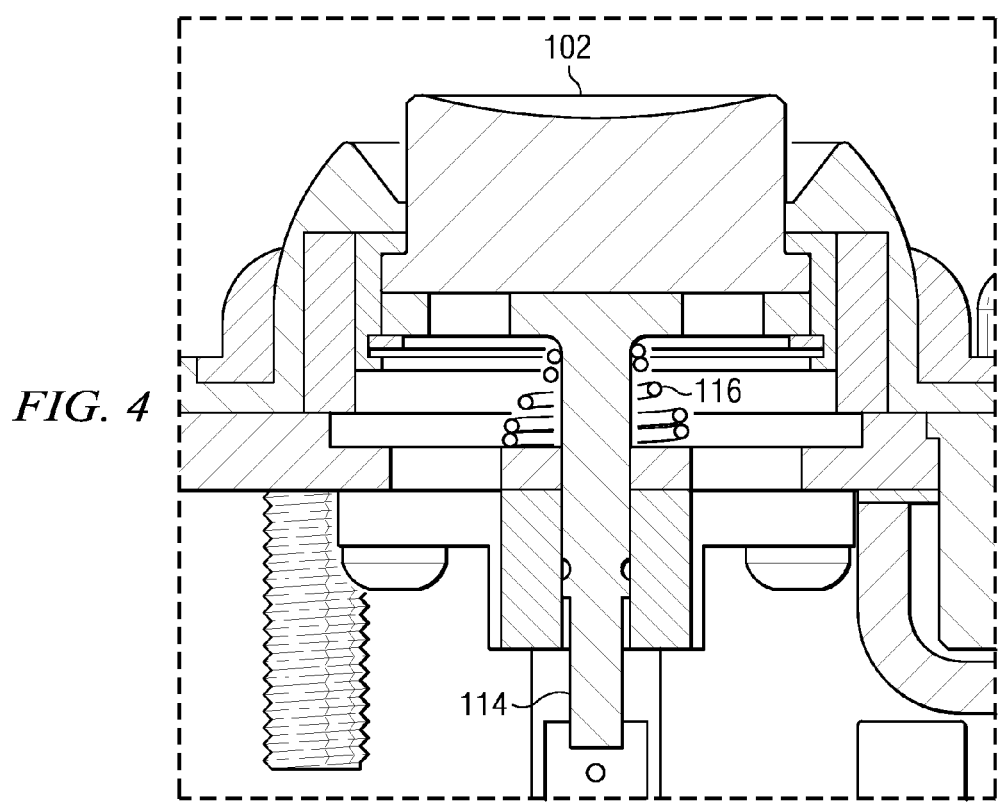
FIG. 4 is an enlarged view of a portion of FIG. 3 as indicated.
Figure 3:
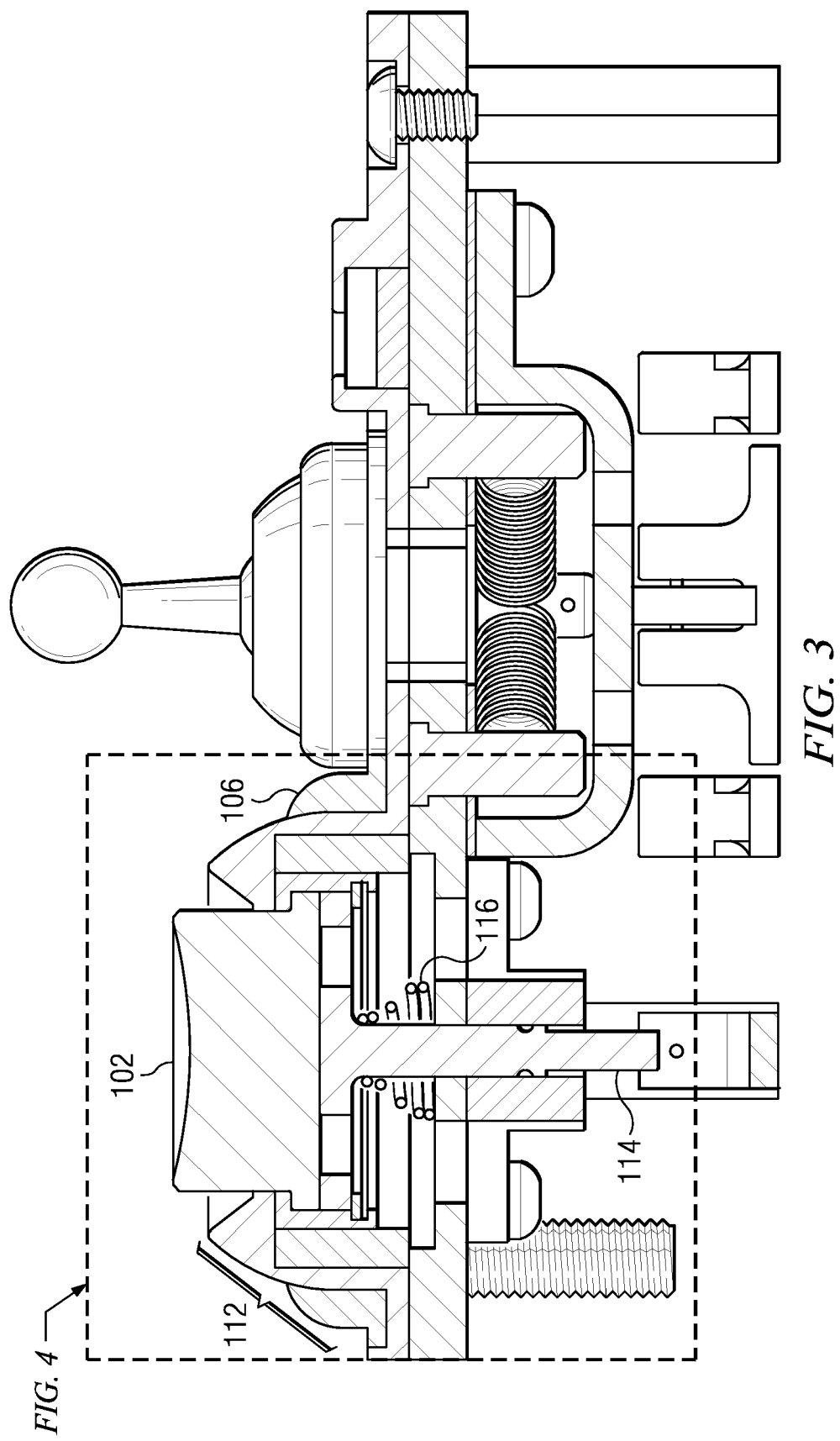
FIG. 3 is a partial sectional view of the switch assembly of FIG. 2*b* taken through a push button switch of the assembly.

FIG. 3 is a partial sectional view taken through push button 102 of assembly 100. Push button 102 is retained in cover plate 110 by means of a retaining assembly 112 including a retaining ring 106. FIG. 4 is an enlarged view of a portion of FIG. 3 as indicated. A push button actuator or plunger 114 is mounted in assembly 100 beneath push button 102. A spring 116 biases actuator 114 and button 102 outwardly from cover plate 110.

Figure 5:
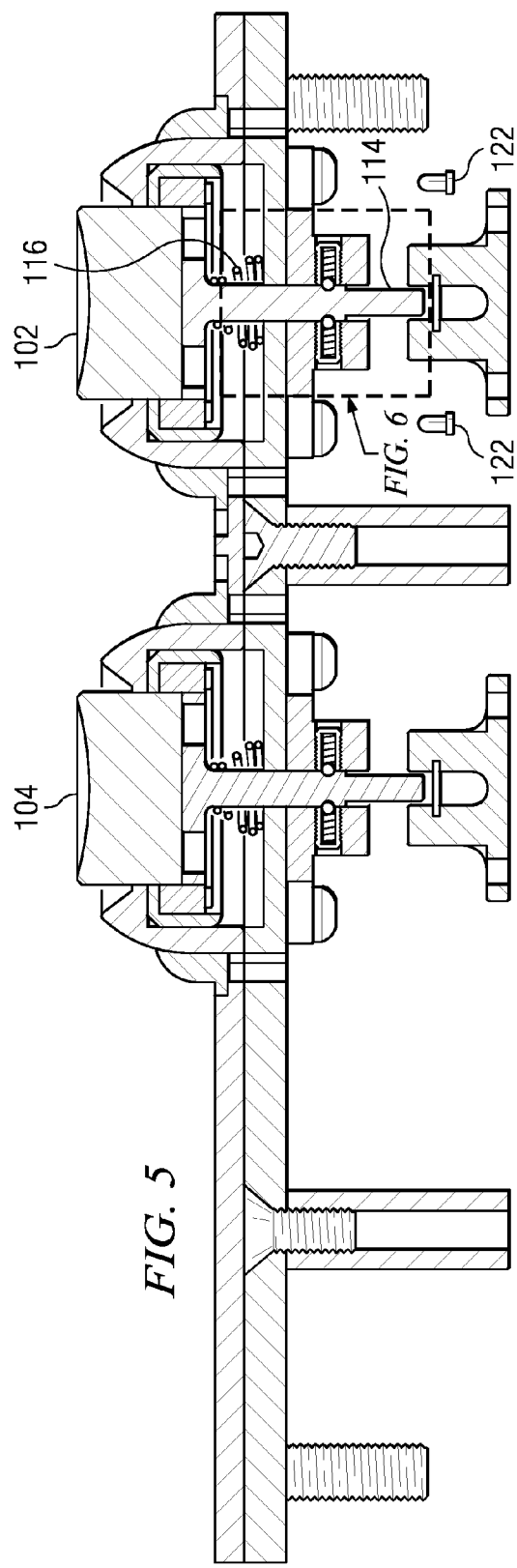
FIG. 5 is a sectional view of the assembly of FIG. 2b taken through two push buttons mounted in the assembly.

FIG. 5 is a partial sectional view of assembly 100 taken through push buttons 102 and 104. A photomicrosensor 118 is mounted below push button 102 and button actuator 114. When button 102 is pushed, button actuator 114 is forced down against spring 116 such that the end of the actuator enters into the photomicrosensor which operates on an optical interrupt principal. Button actuator 114 provides an optical interrupt sensed by photomicrosensor 118, which in turn transmits a signal to energize or de-energize a corresponding function of the vehicle. In the case of push button 102, that function is the vehicle ignition.

Figure 6:
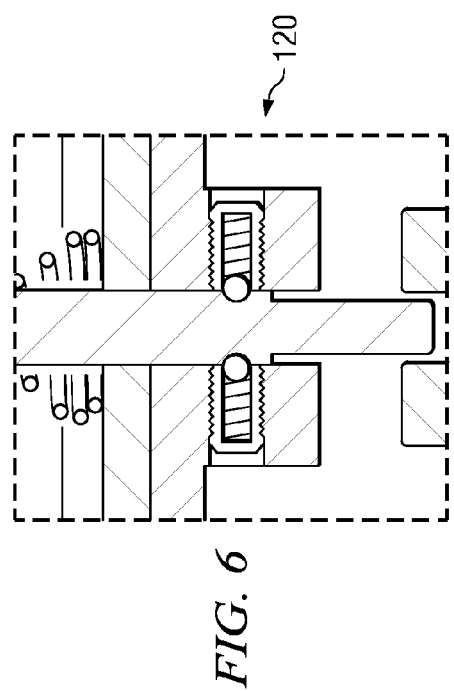
FIG. 6 is an enlarged view of a portion of FIG. 5 as indicated.

FIG. 6 is an enlarged portion of FIG. 5 as indicated. A detent assembly 120 engages button actuator 114. Detent assembly 120 provides a tactile click that allows the operator to determine that the push button has been depressed far enough to actuate photomicrosensor 118.

Referring again to FIG. 5, in one embodiment, assembly 100 includes one or more discrete light sources 122 mounted below or adjacent to push button 102. Discrete light sources 122 may be conventional incandescent bulbs or alternatively light emitting diodes (LEDs). Light sources 122 may emit different colors including red, green, blue, orange and white. Discrete light sources 122 illuminate button 102 to enable the operator of a vehicle in which assembly 100 is mounted to determine the status of the function controlled by the button. In this case, push button 102 controls the vehicle ignition and is illuminated by light sources 122 in a sequence of colors as hereinafter described.

Figure 7B:
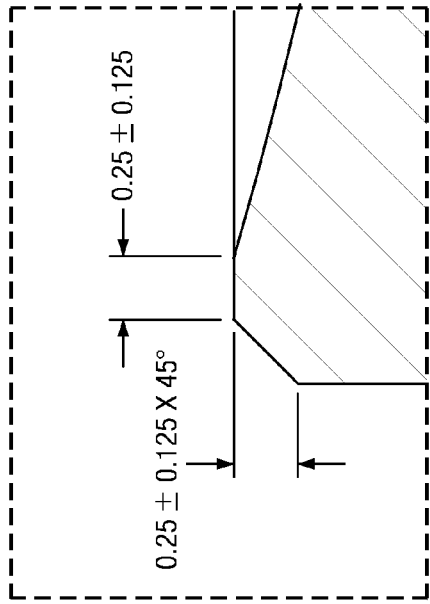
FIG. 7a-7d are various views of a push button for use in the assembly of FIG. 2b as indicated.
Figure 7D:
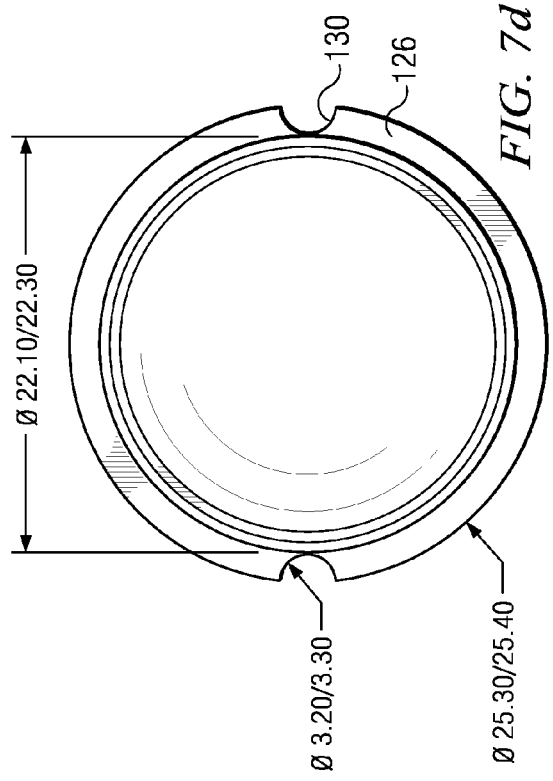
Figure 7A:
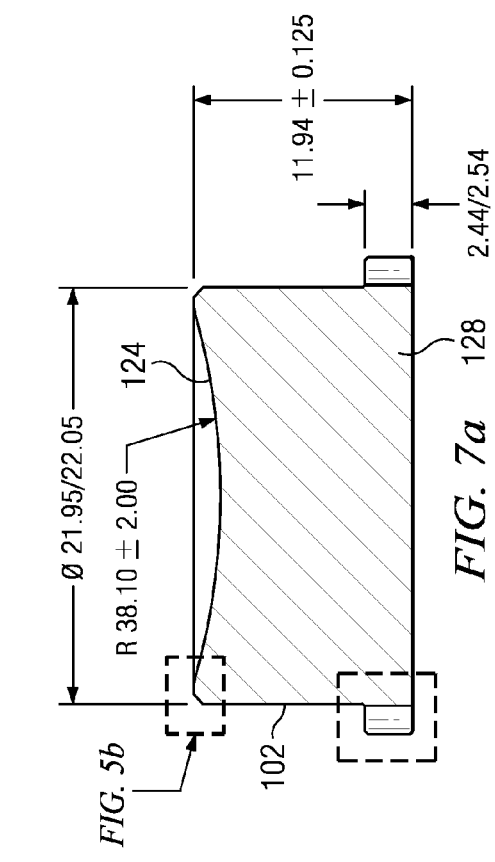
Figure 7C:
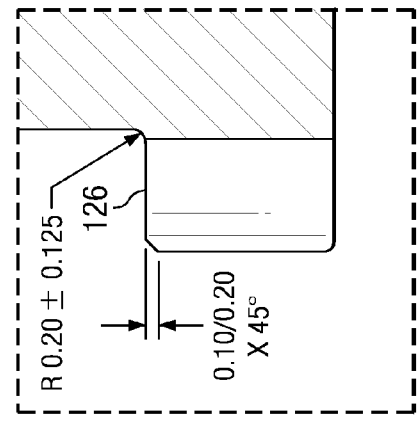

FIG. 7a is a cross-sectional view of synthetic sapphire push button 102 having the indicated dimensions. FIGS. 7b and 7c are partial sectional views of button 102 and FIG. 7d is a top view of button 102. In the embodiment illustrated in FIG. 7a, button 102 has a concave upper surface 124. A flange 126 is formed around the base or lower end 128 of button 102. A pair of notches 130 are formed in flange 126. In one embodiment, notches 130 are engaged by guide pins (not shown) to retain push button 102 in a centered position in retaining assembly 112 (FIG. 3).

In one embodiment, push button 102 is formed entirely from a synthetic sapphire material. Synthetic sapphire is a crystalline form of aluminum oxide ($Al_2O_3$) having a hardness of approximately 9.0 on the Moh's scale. Push buttons formed from conventional materials such as plastic or glass are relatively soft and readily susceptible to scratching. Conventional push buttons formed from plastic and glass are also susceptible to chemical attack from solvents and acids that may etch or discolor the surface of the push button. Plastic push buttons are also subject to yellowing due to aging and/or exposure to radiation. Push buttons formed from synthetic sapphire, on the other hand, are relatively impervious to radiation, chemical attack and may only be scratched by extremely hard material such as diamond.

Figure 8:
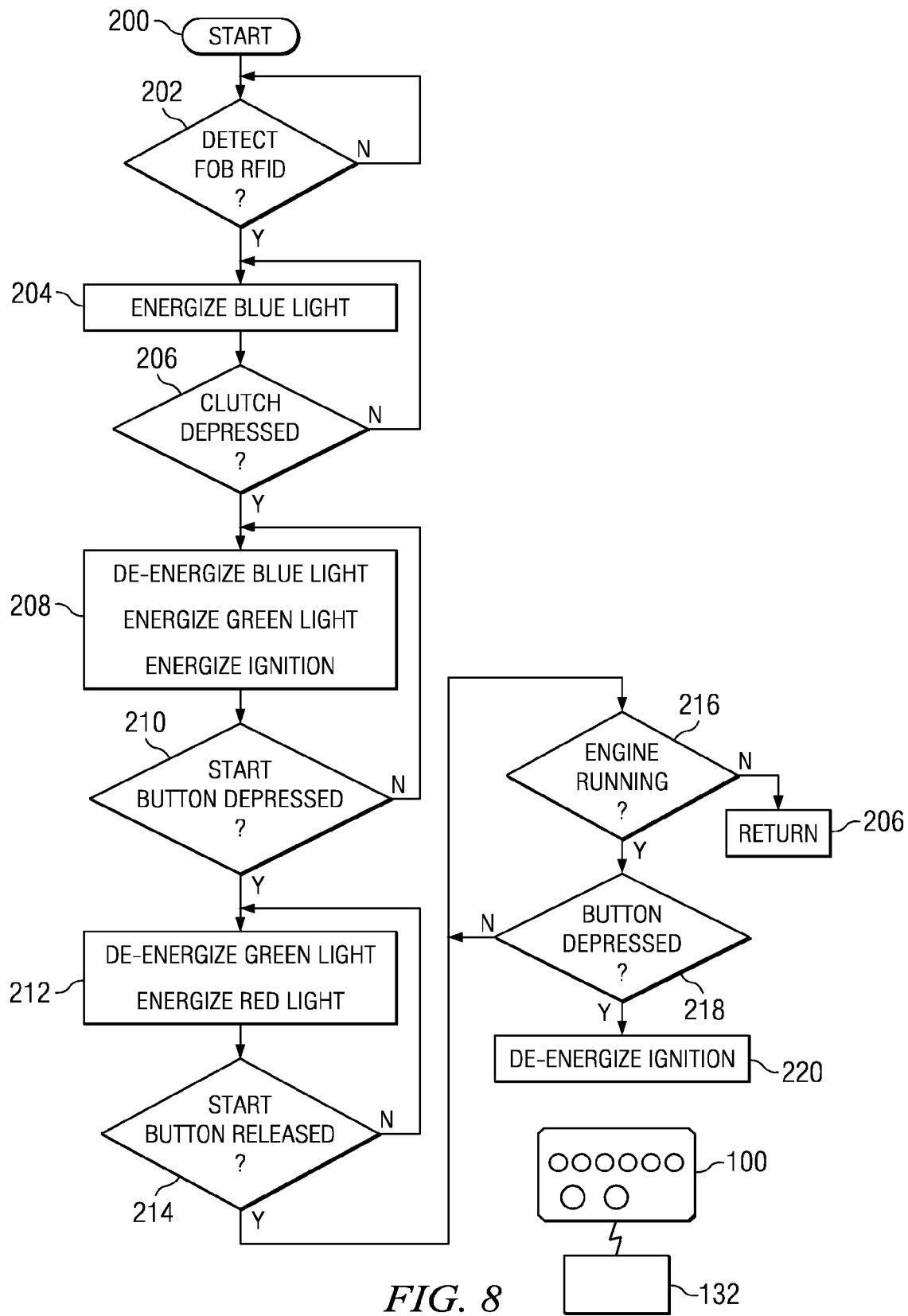
FIG. 8 is a flow chart of a process for starting control and indication in accordance with another aspect.

FIG. 8 is a flow chart illustrating the steps of a vehicle starting and process ignition control that may be implemented using assembly 100 and a microcontroller or microprocessor 132 for a vehicle having a manual transmission. At step 200 the operator of a vehicle in which assembly 100 is mounted approaches the vehicle. At step 202 a transmitter such as a fob RFID is detected by a sensor (not shown) mounted on the vehicle. The sensor transmits a signal to microprocessor 132 which in turn energizes one or more of discrete light sources 122 to illuminate button 102 with a selected color, for example, blue. Microprocessor 132 may have an associated memory 134 including pre-programmed instructions for controlling the vehicle's ignition and starter motor in response to signals from various sensors and the photomicrosensor 118 associated with push button 102.

At step 206 a second sensor (not shown) senses the clutch of the vehicle being depressed or disengaged by the operator. The second sensor transmits a signal to microprocessor 132 which in turn de-energizes the first blue discrete light source and energizes a green light source such that button 102 glows green. Simultaneously, microprocessor 132 energizes the ignition system. At step 210, the operator depresses button 102 to engage the vehicles starter motor. Microprocessor 132, sensing the button being depressed, de-energizes second green light source 122 and energizes a third red light source 122 such that button 102 glows red. At step 214 the operator releases button 102. Microprocessor 132 then determines whether the engine of the vehicle is running at step 216. If the attempt to start the vehicle failed, the microprocessor returns to step 206. Alternatively, if the vehicle engine is running, the next time button 102 is depressed at step 218, microprocessor 132 de-energizes the ignition system at step 224. Thus, the color of button 102 indicates the starter/ignition states or step that will occur after the action.

Figure 9:
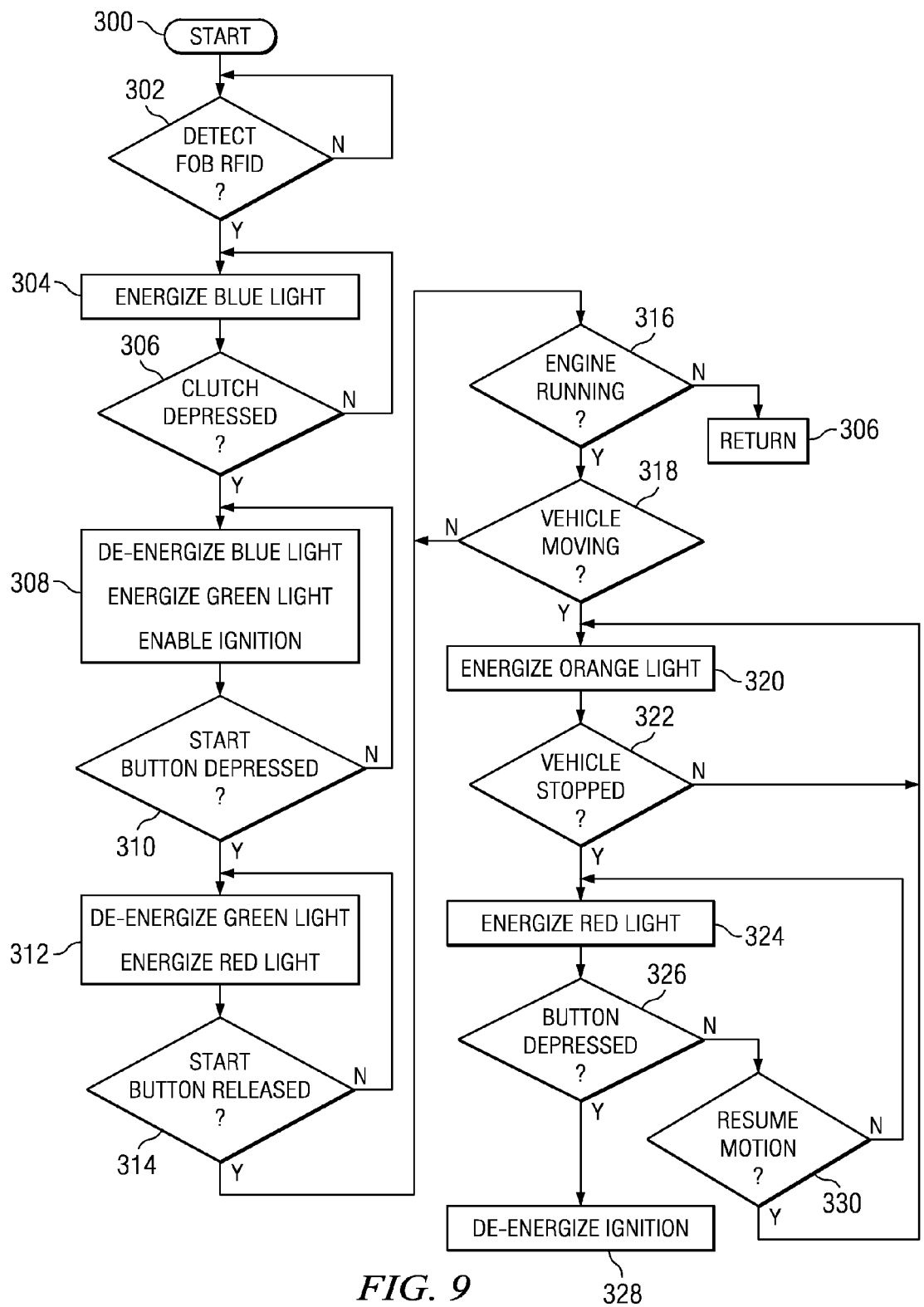
FIG. 9 is a variation of the process of FIG. 8.

FIG. 9 is a flow chart illustrating a method similar to that shown in FIG. 8. Steps 300-316 of FIG. 9 are essentially the same as steps 200 through 216 of FIG. 8. At step 316, microprocessor 132 determines whether the vehicle's engine is running. If the vehicle's engine failed to start, the process returns to step 306. If the vehicle's engine is running, the microprocessor determines whether the vehicle is moving at step 318 by means of, for example, a wheel speed switch. If the vehicle is moving, microprocessor 132 energizes a fourth colored discrete light source 122, for example, an orange light source, at step 320 such that button 102 glows orange. The orange light source remains energized as long as the vehicle is moving. When the vehicle stops at step 322, microprocessor 132 de-energizes the orange light source 122 and energizes a red light source 122, (step 324) or an alternative color, indicating that the vehicle stopped and that the operator may stop the vehicles engine by pressing button 102. Notably, while the orange light source 122 is energized and button 102 is glowing orange, microprocessor 132 will not allow the vehicle's ignition to be de-energized. This prevents the vehicle's engine from being stopped inadvertently if button 102 is bumped as the vehicle is moving. When the vehicle stops, red light source 122 is energized such that button 102 glows red, indicating to the operator that the engine may be stopped by depressing button 102. If the button 102 is depressed at step 326, microprocessor 132 de-energizes the ignition system at stop 328, stopping the vehicles engine. If the button is not depressed at step 326, and the vehicle resumes motion, at step 330 the microprocessor 132 loops back to step 320, energizing the orange light source 122 and de-energizing the red light source 122, and resuming the process at that point.

It will be appreciated by those skilled in the art having the benefit of this disclosure that this starter indicator system provides a vehicle ignition control and display system. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A single-button ignition control and starting system for a vehicle having an engine, an ignition system, a starter motor and a manually-operated clutch pedal, the system comprising:
   an onboard computer operatively connected to the ignition system for selectively energizing the ignition system and operatively connected to the starter motor for selectively energizing the starter motor;
   a start button operatively connected to the onboard computer and adapted to produce signals indicative of whether the button is depressed;
   a light source operatively connected to the onboard computer and adapted to selectively illuminate the start button in a first, second and a third illumination color;
   a clutch sensor operatively connected to the onboard computer and adapted to produce signals indicative of whether the clutch pedal is depressed;
   an engine sensor operatively connected to the onboard computer and adapted to produce signals indicative of whether the engine is running;
   an identity sensor adapted to receive identity indicia and operatively connected to the onboard computer for producing signals indicative of the identity indicia received; and
   wherein, when the onboard computer
      receives signals from the identity sensor indicative of a predetermined identity indicia being received,
      receives signals from the engine sensor indicative of the engine not running, and
      receives signals from the clutch sensor indicative of the clutch pedal not being depressed,
   then the onboard computer
      energizes the light source to illuminates the start button in the first illumination color and
      does not energize the starter motor if the start button is depressed.

2. The single-button ignition control and starting system in accordance with claim 1, wherein:
   when the onboard computer
      receives signals from the identity sensor indicative of the predetermined identity indicia being received,
      receives signals from the engine sensor indicative of the engine not running and
      receives signals from the clutch sensor indicative of the clutch pedal being depressed,
   then the onboard computer,
      when the start button is not depressed, energizes the light source to illuminates the start button in the second illumination color and does not energize the starter motor, and
      when the start button is depressed, energizes the ignition system and energizes the starter motor.

3. The single-button ignition control and starting system in accordance with claim 2, wherein:
   when the onboard computer receives signals from the engine sensor indicative of the engine running,
   then the onboard computer energizes the light source to illuminates the start button in the third illumination color, and
   when the start button is depressed, de-energizes the ignition system.

4. The single-button ignition control and starting system in accordance with claim 2, further comprising:
   a movement sensor operatively connected to the onboard computer and adapted to produce signals indicative of whether the vehicle is moving;
   the light source being further adapted to illuminate the start button in a fourth illumination color; and
   when the onboard computer receives signals from the engine sensor indicative of the engine running and receives signals from the movement sensor indicative of the vehicle moving,
   then the onboard computer
      energizes the light source to illuminates the start button in the fourth illumination color and
      does not de-energize the ignition system if the start button is depressed.

5. The single-button ignition control and starting system in accordance with claim 4, wherein:

when the onboard computer receives signals from the engine sensor indicative of the engine running and receives signals from the movement sensor indicative of the vehicle not moving,
then the onboard computer
energizes the light source to illuminates the start button in the third illumination color and
de-energizes the ignition system if the start button is depressed.

6. The single-button ignition control and starting system in accordance with claim 4, wherein the start button is formed of a translucent material and the light source is disposed behind the start button.

7. The single-button ignition control and starting system in accordance with claim 4, wherein the second illumination color is green and the third illumination color is red.

8. The single-button ignition control and starting system in accordance with claim 4, wherein the identity sensor is a Radio Frequency Identification (RFID) transceiver adapted to receive identity indicia from a proximate RFID tag.

9. The single-button ignition control and starting system in accordance with claim 8, wherein the RFID tag is mounted on a pocket fob.

10. The single-button ignition control and starting system in accordance with claim 4, wherein the identity sensor is a card reader adapted to receive identity indicia from a proximate identity card.

11. The single-button ignition control and starting system in accordance with claim 10, wherein the identity card further comprises a magnetic stripe with embedded identity indicia.

12. The single-button ignition control and starting system in accordance with claim 10, wherein the identity card further comprises an embedded integrated circuit device with embedded identity indicia.

* * * * *